United States Patent
Kobayashi

(10) Patent No.: US 8,490,266 B2
(45) Date of Patent: Jul. 23, 2013

(54) MANUFACTURING METHOD OF DRIVING BELT

(75) Inventor: Daisuke Kobayashi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 668 days.

(21) Appl. No.: 12/745,998

(22) PCT Filed: Dec. 2, 2008

(86) PCT No.: PCT/JP2008/071840
§ 371 (c)(1),
(2), (4) Date: Jun. 3, 2010

(87) PCT Pub. No.: WO2009/072479
PCT Pub. Date: Jun. 11, 2009

(65) Prior Publication Data
US 2010/0243131 A1 Sep. 30, 2010

(30) Foreign Application Priority Data
Dec. 3, 2007 (JP) ................................. 2007-312690

(51) Int. Cl.
*B23Q 17/00* (2006.01)

(52) U.S. Cl.
USPC ........... 29/407.1; 29/446; 29/281.5; 474/201; 474/202; 156/137

(58) Field of Classification Search
USPC .............. 29/407.1, 428, 281.5, 446; 156/137; 474/201, 202
See application file for complete search history.

(56) References Cited

U.S. PATENT DOCUMENTS

| 4,692,985 | A | * | 9/1987 | Van Dijk | 29/450 |
| 6,074,317 | A | * | 6/2000 | Kobayashi | 474/201 |
| 6,468,174 | B1 | * | 10/2002 | Brandsma et al. | 474/242 |

(Continued)

FOREIGN PATENT DOCUMENTS

| JP | 59 183557 | 12/1984 |
| JP | 2000 266130 | 9/2000 |

(Continued)

OTHER PUBLICATIONS

2002160131 English Translation; Masao Nitta et al.; Assembly Method for a No-Stage Gearshift Belt; Apr. 6, 2002, pp. 1-15.*

(Continued)

*Primary Examiner* — David Bryant
*Assistant Examiner* — Bayan Salone
(74) *Attorney, Agent, or Firm* — Oblon, Spivak, McClelland, Maier & Neustadt, L.L.P.

(57) ABSTRACT

A manufacturing method of a driving belt, which can measure and adjust an endplay of the driving belt including a ring and elements to improve productivity of the driving belt, the method including: obtaining a correlation among a circumferential length of the ring, a total weight of the elements fastened by the ring, and a range of a movement of the fastened elements in the length direction of the ring; determining a range of a required element weight as a total weight of the elements to be fastened by the ring, on the basis of the obtained correlation, a desired moving range of the element, and the length of the ring; feeding the elements in the amount within the range of the required element weight while measuring a total weight of the element being fed; and fastening the element fed at the element feeding by the ring.

4 Claims, 6 Drawing Sheets

U.S. PATENT DOCUMENTS

| | | | |
|---|---|---|---|
| 6,578,249 B2 * | 6/2003 | Fujioka | 29/434 |
| 6,708,383 B2 * | 3/2004 | Arikawa et al. | 29/407.05 |
| 6,875,143 B2 * | 4/2005 | Brandsma | 474/242 |
| 7,188,430 B2 * | 3/2007 | Tange | 33/544.4 |
| 7,963,873 B2 * | 6/2011 | Kobayashi | 474/242 |
| 8,062,159 B2 * | 11/2011 | Kanehara et al. | 474/201 |
| 8,187,129 B2 * | 5/2012 | Kobayashi | 474/242 |
| 2002/0025871 A1 * | 2/2002 | Fujioka | 474/242 |
| 2009/0258743 A1 * | 10/2009 | Kobayashi | 474/248 |
| 2010/0016112 A1 * | 1/2010 | Kobayashi | 474/255 |
| 2010/0016113 A1 * | 1/2010 | Kobayashi | 474/261 |
| 2011/0201467 A1 * | 8/2011 | Kobayashi | 474/240 |

FOREIGN PATENT DOCUMENTS

| | | | |
|---|---|---|---|
| JP | 2002 48194 | | 2/2002 |
| JP | 2002048194 A | * | 2/2002 |
| JP | 2002-160131 | | 6/2002 |
| JP | 2002160131 A | * | 6/2002 |
| JP | 2004 218802 | | 8/2004 |
| JP | 2004 225787 | | 8/2004 |
| JP | 2004218802 A | * | 8/2004 |
| JP | 2004225787 A | * | 8/2004 |
| JP | 2005 55283 | | 3/2005 |
| JP | 2005 115632 | | 4/2005 |
| JP | 2005 315288 | | 11/2005 |

OTHER PUBLICATIONS

Extended European Search Report issued Mar. 29, 2011, in European Patent Application No. 08857648.3.

* cited by examiner

Fig. 7

Table of Combined Weight (in case N=11)

| Number of Main Element | Number of Adjuster Element | Combined Weight Wcmb | Total Weight W of Element |
|---|---|---|---|
| 11 | 0 | a | A |
| 10 | 1 | b | B |
| 9 | 2 | c | C |
| 8 | 3 | d | D |
| 7 | 4 | e | E |
| 6 | 5 | f | F |
| 5 | 6 | g | G |
| 4 | 7 | h | H |
| 3 | 8 | i | I |
| 2 | 9 | j | J |
| 1 | 10 | k | K |
| 0 | 11 | l | L |

MANUFACTURING METHOD OF DRIVING BELT

TECHNICAL FIELD

This invention relates to a manufacturing method of a driving belt comprising annular rings and a plurality of plate-like elements.

BACKGROUND ART

In the prior art, a geared transmission and a continuously variable transmission capable of varying a speed change ratio steplessly are available as a transmission mechanism for transmitting power between rotary members. For example, a belt-type continuously variable transmission and a toroidal-type continuously variable transmission are known as the continuously variable transmission. Specifically, the belt-type continuously variable transmission is a transmission varying a speed change ratio continuously using a pair of drive pulleys and a pair of driven pulleys, and a driving belt applied to those pulleys. The known endless driving belt used in such belt-type continuously variable transmission is prepared by arranging a plurality of plate members called an "element" or a "block" in a circular manner, and fastening the plate members by an annular metal belt called a "ring" or a "hoop".

When the driving belt thus applied to the drive and driven pulleys is driven by driving the drive pulley, a frictional force acts on a contact portion between the element and the drive pulley, and a compressive force is applied to the elements in the arranging direction thereof, i.e., in the thickness direction thereof according to a torque of the drive pulley. The compressive force applied to the element being contacted with the drive pulley is transmitted to the element being contacted with the driven pulley via the elements situated linearly between the drive and driven pulleys. When the compressive force is transmitted to the element being contacted with the driven pulley, a frictional force is generated at the contact portion between the element and the driven pulley, and a torque to rotate the driven pulley is established according to the transmitted compressive force. The power is thus transmitted between the drive and driven pulley through the driving belt.

Japanese Patent Laid-Open No. 2000-266130 disclose an invention relating to an element peripheral length measuring method and a measuring device for controlling a clearance between the elements of a drive belt easily and accurately. According to the element peripheral length measuring method and the measuring device taught by Japanese Patent Laid-Open No. 2000-266130, a plural number of elements are arranged in a circular arc shape in a recessed part of a guide block, and the elements thus accumulated and arranged are pressed along the circular arc shape by a pusher. A moving quantity at such pressing time is measured by a linear gauge to obtain a peripheral length along the circular arc shape, and a clearance is computed by comparing the peripheral length of the elements with a peripheral length of a ring member which is previously measured.

Meanwhile, Japanese Patent Laid-Open No. 2005-55283 discloses an apparatus for measuring a clearance between elements of a belt for a gearless drive mechanism. The apparatus taught by Japanese Patent Laid-Open No. 2005-55283 comprises: a pair of opening and closing arms freely opening and closing in a circumferential direction of the belt; a pair of gripping members for sandwiching body parts of the elements from both sides of width directions; and a measuring means for measuring the amount of a clearance between the opening and closing arms on the basis of the amount of operation of a drive source for opening the opening and closing arms. According to the teachings of Japanese Patent Laid-Open No. 2005-55283, the opening and closing arms are opened in the circumferential direction of the belt while gripping the body parts of the elements by the gripping member, and the amount of a clearance between the elements is determined on the basis of a measurement value of amount of opening by the measuring means at the time.

In addition to above, Japanese Patent Laid-Open No. 2005-315288 discloses an inspection device for a continuously variable transmission belt comprising: a large number of consecutively attached metal elements punched and processed into a specified shape; and a metal stepless belt for supporting the metal elements. According to the teachings of Japanese Patent Laid-Open No. 2005-315288, a clearance between the metal elements is quantitatively inspected directly using a wedge-shaped inspection jig.

Further, Japanese Utility Model 59-183557 discloses a driving belt for a continuously variable transmission, comprising: a carrier (i.e., a belt) of an endless metal belt; and a plurality of V-blocks (i.e., elements). Each of the elements comprises a body portion and a carrier groove, and those elements are attached to the belt in a movable manner in a length direction of the belt. According to the teachings of Japanese Utility Model 59-183557, clearances between the adjoining elements are adjusted by an adjustment V-block (i.e., element) having a different thickness to adjust the clearances between the adjoining elements at the end of assembling.

In order to optimize an endplay of a driving belt, the endplay of the driving belt has to be maintained within a desired range by measuring a clearance between the adjoining elements, in other words, by measuring a range of movement of the elements fastened by the ring in the length direction of the belt as the endplay of the driving belt, using the device taught by Japanese Patent Laid-Open No. 2000-266130, Japanese Patent Laid-Open No. 2005-55283 or Japanese Patent Laid-Open No. 2005-315288, and by selecting a suitable adjustment element such as the element for adjusting a clearance between the element taught by Japanese Utility Model 59-183557 in accordance with the measurement result.

However, according to the teachings of Japanese Patent Laid-Open No. 2000-266130, Japanese Patent Laid-Open No. 2005-55283 and Japanese Patent Laid-Open No. 2005-315288, a dedicated measuring or inspecting instrument or tool is required to measure the endplay of the driving belt. Therefore, the cost of measuring the endplay of the driving belt has to be increased to introduce such an instrument. In addition, all of the elements have to be juxtaposed or fastened by the ring to measure the endplay. Therefore, a number of processes has to be increased to arrange the elements and to fasten the elements. As a result, productivity of the driving belt has to be degraded.

DISCLOSURE OF THE INVENTION

The present invention has been conceived noting the technical problems thus far described, and its object is to provide a manufacturing method of a driving belt which can measure and adjust an endplay of a driving belt easily and accurately without using any specific measuring device or equipment, and for improving productivity of the driving belt.

In order to achieve the above-mentioned object, according to the present invention, there is provided a manufacturing method of a driving belt having an endless ring, and a plurality of plate elements juxtaposed in a length direction of the ring and fastened by the ring, characterized by comprising: a preliminary step of obtaining a correlation among a circumferential length of the ring, a total weight of the elements fastened by the ring, and a range of a movement of the fastened elements in the length direction of the ring; an element weight determining step of determining a range of a required element weight as a total weight of the elements to be fastened by the ring, on the basis of the obtained correlation, a desired moving range of the element, and the length of the ring; an element feeding step of feeding the elements in the amount within the range of the required element weight determined at the element weight determining step, while measuring a total weight of the element being fed; and an assembling step of fastening the element fed at the element feeding step by the ring.

The aforementioned element feeding step includes: a step of feeding the elements sequentially to a weight scale while measuring a total weight of the elements being fed; a step of preparing a batch of the elements in the amount of a temporary element weight, by stopping the feeding of the elements at a moment when the total weight of the element being fed exceed a target feeding weight which is set smaller than a lower limit of the range of the required elements weight; a step of preparing another batch of the elements in the amount corresponding to a difference between the range of the required element weight and the temporary element weight; and providing both of the batches of the elements to the assembling step.

Specifically, the element includes a main element and an adjuster element having a different individual weight from that of the main element; the preliminary step includes a step of obtaining a plurality of combined weights of combinations of a various quantity of the main element(s) and a various quantity of the adjuster element(s); and the element feeding step includes a step of feeding the batch of the elements prepared in the amount of the temporary element weight, together with another batch of the elements including the main element(s) and the adjuster element(s) prepared in the amount of one of the combined weights selected from the combined weights obtained at the preliminary step to compensate a shortage of the elements with respect to the required element weight.

In addition to above, the weight of the adjuster element is lighter than that of the main element.

Thus, according to the present invention, the circumferential length of the ring, the total weight of the elements fastened by the ring, and the range of movement of the fastened elements in the length direction of the ring, that is, an endplay of the drive belt are measured from an assembled sample driving belt at the preliminary step by a skilled person. Then, the correlation among the measured parameters such as the circumferential length of the ring, the total weight of the elements fastened by the ring, and the endplay of the driving belt are obtained in advance. Therefore, the endplay of the assembled driving belt can be obtained by substituting the total weight of the elements fastened by the ring and the length of the ring into a relational expression expressing the above explained correlation, or using a correlation diagram expressing the above explained correlation. That is, provided that the length of the ring has already been measured and stored in advance of assembling the driving belt, the endplay of the driving belt can be obtained by merely measuring the total weight of the elements to be fastened by the ring to substitute the measured weight into the relational expression together with the known length of the ring.

In addition, the total weight of the elements to be fastened by the ring, that is, the required element weight can also be obtained on the basis of the relation between the endplay of the driving belt and the length of the ring measured at the preliminary step. Therefore, the range of the required element weight to maintain the endplay of the driving belt within a desired range after fastening the elements by the ring can be calculated at the element weight determining step, on the basis of the desired range of the driving belt and the measured value of the length of the ring.

At the element feeding step, the weight of the elements being fed is measured to be prepared and fed in the amount within the range of the required element weight determined at the element weight determining step. Then, the elements thus fed at the element feeding step are fastened by the ring at the subsequent assembling step to complete the assembling work of the driving belt.

Thus, according to the present invention, the correlation among the circumferential length of the ring, the total weight of the elements fastened by the ring, and the endplay of the drive belt is obtained in advance at the preliminary step. The elements are fed at the element feeding step in the proper amount determined at the element weight determining step using the correlation obtained at the preliminary step. Then, the elements fed at the element feeding step are fastened by the ring at the assembling step. Therefore, conventional measuring and adjusting steps of the endplay of the driving belt after fastening the elements by the ring can be omitted. Moreover, a disassembly and a reassembly of the driving belt after the measurement and adjustment of the endplay can also be omitted. For this reason, the productivity of the driving belt can be improved significantly.

BRIEF DESCRIPTION OF THE DRAWINGS

FIG. 7 is a table listing combined weights of each combination of the main element(s) and the adjuster element(s) of the driving belt to which the present invention is applied.

BEST MODE FOR CARRYING OUT THE INVENTION

Figure 1:
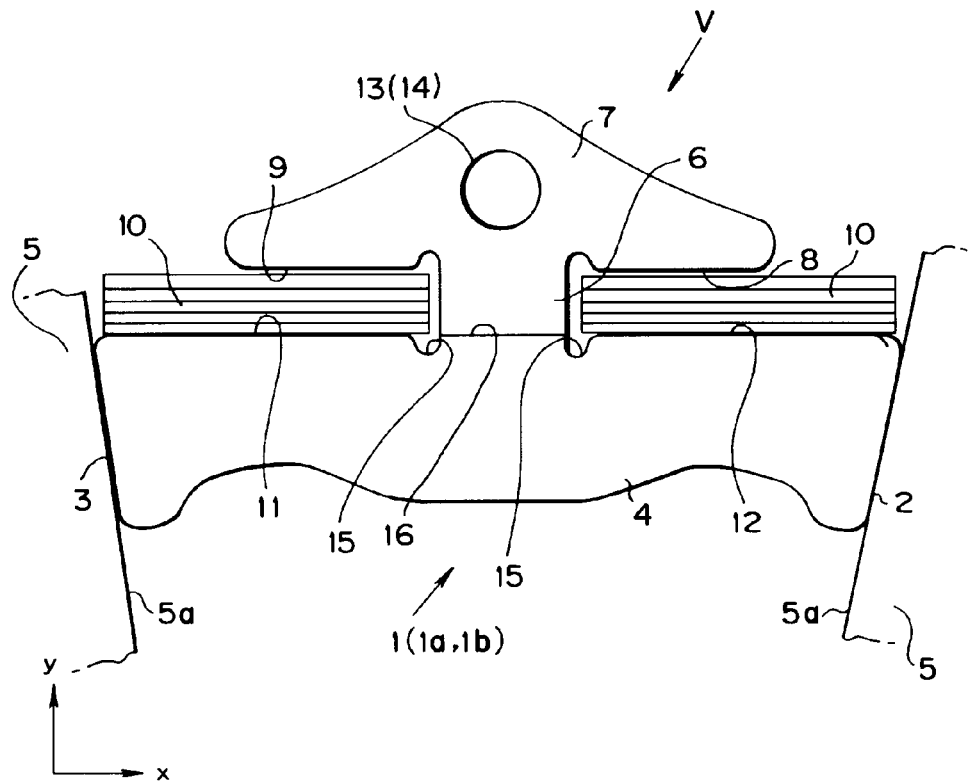
FIG. 1 is a front view schematically showing a structure of the driving belt and a configuration of the element to which the present invention is applied.
Figure 2:
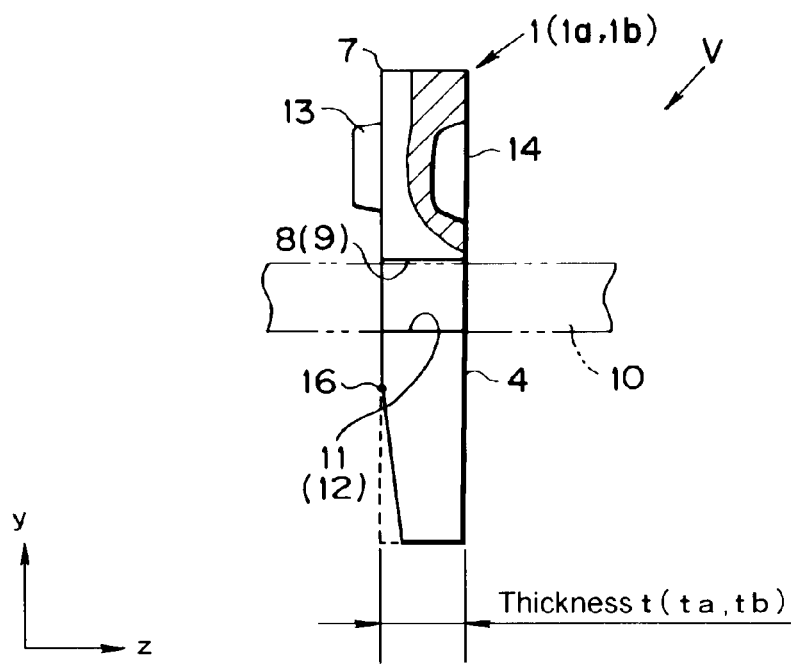
FIG. 2 is a side (partial) sectional view schematically showing a structure of the driving belt and a configuration of the element to which the present invention is applied.

Next, this invention will be explained with reference to the accompanying drawings. An example of the structure of the driving belt V to which the present invention is applied is shown in FIGS. 1 and 2. For example, the driving belt V shown in FIGS. 1 and 2 is applied to a drive pulley (i.e., an input shaft) and a driven pulley (i.e., an output shaft) of a belt-type continuously variable transmission to transmit a torque between those pulleys. According to the example, the element 1 shown in FIG. 1 is a metal plate member, and the element 1 comprises a plate member 4 serving as a base plate (or main body). Both right and left lateral faces (in the direction of x-axis in FIG. 1) of the plate member 4 are tapered to function as frictional faces 2 and 3. The frictional faces 2 and 3 are frictionally contacted with a V-shaped groove 5*a* of a drive or driven pulley 5 of the belt type continuously variable transmission to transmit a torque.

A neck portion 6 extends upwardly in FIG. 1 from a width center of the plate member 4, and an upper element 7 extending toward both of the lateral ends (i.e., in the direction of x-axis in FIG. 1) of the plate member 4 like a canopy is formed integrally with the neck portion 6. Consequently, slits (or grooves) 8 and 9 opening laterally are formed on both sides of the neck portion 6 between an upper edge (in FIGS. 1 and 2) of the plate member 4 and a lower edge (in FIGS. 1 and 2) of the upper element 7. A ring 10 as an annular belt-like member made of metal is individually fitted into the slits 8 and 9 thereby fastening an array of elements 1 juxtaposed closely in a circular manner. That is, the upper edges of the plate member 4 individually serve as saddle faces 11 and 12 on which the ring 10 is mounted, in other words, onto which an inner circumferential face of the ring 10 is contacted.

The element 1 comprises a male connection 13 and a female connection 14. Specifically, as shown in FIGS. 1 and 2, the male connection 13 of circular truncated cone is formed on one of the faces of the upper element 7 above the neck portion (i.e., on a width center of the element 7). In other words, the male connection 13 is formed on a side on which a rocking edge 16 to be explained later with reference to FIG. 2 is formed. On the other hand, the bottomed cylindrical female connection 14 to which the male connection 13 of adjoining element 1 is inserted loosely is formed on a face opposite to the face on which the male connection 13 is formed. Therefore, a relative position of the elements 1 in both vertical and horizontal directions can be determined by inserting the male connection 13 into the female connection 14 of the adjoining elements 1.

According to the elements 1 thus structured, displacement of the elements 1 in the element array is restricted by connecting the male connection 13 with the female connection 14. In addition, a load derived from a tension of the ring 10 is applied individually to the saddle faces 11 and 12 downwardly in FIGS. 1 and 2. Therefore, if a distance between the male connection 13 or the female connection 14 to a level at which the saddle face 11 and 12 are formed is varied among the connected elements 1, the load of the ring 10 is applied in the direction of y-axis in FIG. 1. In this case, a maximum bending moment acts at a corner between the neck portion 6 and the saddle face 11 or 12 extending orthogonally (i.e., in the direction of x-axis in FIG. 1) from the neck portion 6. Therefore, in order to avoid stress concentration, each corner between the neck portion 6 and the saddle face 11 or 12 is rounded as shown in FIG. 1 thereby forming a rounded corner 15.

As described, the elements 1 are interlinked with one another in a circular manner and fastened by the ring 10. The elements 1 thus fastened by the ring 10 is applied to the drive and drive pulleys 5. In case the driving belt V is applied to the pulleys 5, clearances between the elements 1 are narrowed gradually toward a rotational center of the pulleys 5, in other words, the array of the elements 1 thus fastened by the ring 10 is bent into arcuate in a region where the elements 1 are contacted with the pulleys 5, and the elements 1 are eventually contacted with one another at its portion close to the rotational center of the pulley 5. For this reason, a thickness of the element 1 has to be thinned at its lower portion, that is, at the portion close to the rotational center of the pulley 5, as illustrated in FIGS. 1 and 2.

According to the example shown in FIGS. 1 and 2, one of the faces of the plate member 4 i.e., the left face in FIG. 2 is thinned gradually from a predetermined portion below the saddle face 11 or 12. In other words, a predetermined portion of one of the faces of the plate member 4 (in the direction of z-axis in FIG. 2) below the saddle face 11 or 12 is thinned gradually toward the lowest portion of the plate member 4 in a height direction of the element 1 (i.e., in the direction of y-axis in FIGS. 1 and 2), that is, in a radial direction of the case in which the array of the elements 1 is bent into arcuate.

Therefore, in case the driving belt V is applied to the pulleys 5, the elements 1 are contacted with the adjoining element 1 at the portion where the thickness thereof is gradually reduced. That is, an edge of a boundary of thickness functions as a rocking edge 16, which is to be contacted with the adjoining element 1 in the region where the array of the elements 1 is bent into arcuate.

Figure 3:
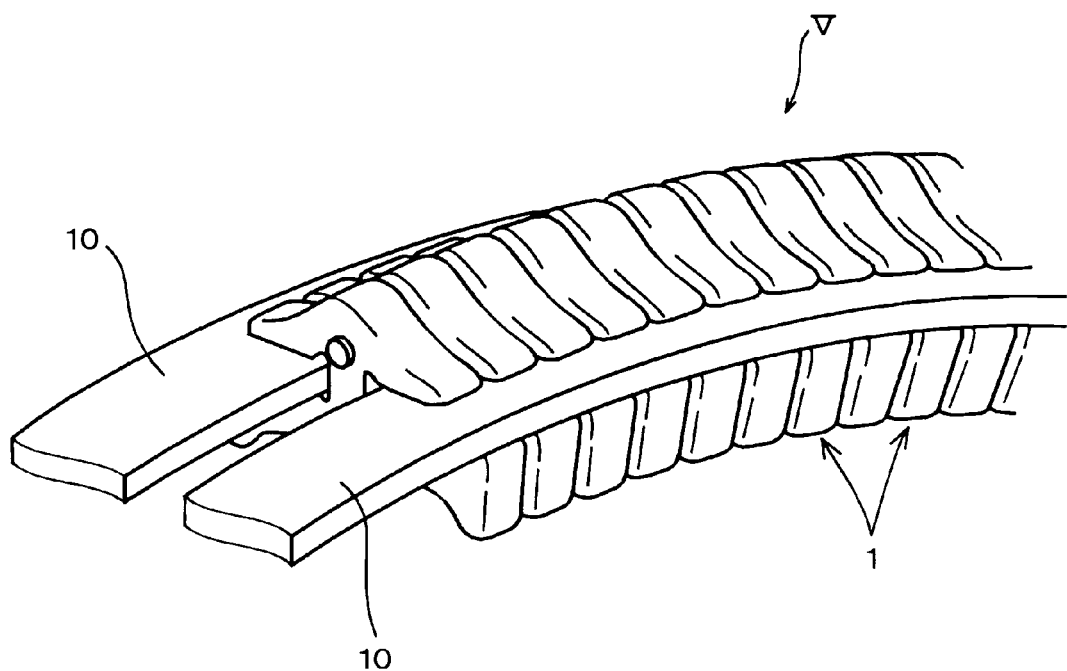
FIG. 3 is a perspective view partially showing the driving belt to which the present invention is applied.

As illustrated in FIG. 3, the driving belt V is structured by fastening the array of the elements 1 by the two rings 10. More specifically, the predetermined number of the elements 1 is juxtaposed to one another in a same orientation to form the circular element array, and the array of the elements 1 is fastened by the rings 10 fitted individually into the slits 8 and 9.

In the driving belt V thus structured, a clearance exists individually between the adjoining elements 1. That is, the assembled driving belt V has an endplay, which is a circumferential moving range of the elements 1 thus fastened by the rings 10. If such endplay of the driving belt V is widened, a slippage between the ring 10 and the element 1 may occur. As a result, a power transmission efficiency of the driving belt V may be degraded, and a durability of the driving belt V may also be deteriorated. In order to avoid such disadvantages, it is important to control the endplay properly when assembling the driving belt V. That is, it is necessary to measure the endplay accurately to maintain the endplay of the driving belt V properly.

The element 1 thus has been explained is basically punched out from a metal sheet. In order to avoid a load eccentricity and a stress concentration, high accuracy is required to form an outline of the element 1. Therefore, the element 1 is formed by a precision press working such as a precision punching or a fine blanking. Specifically, a forming tolerance of the outline of the element 1 is kept within $\pm 10\,\mu m$. However, a shape of the element 1 in its thickness direction is not required to be as accurate as its outline. Therefore, the shape of the element 1 in its thickness direction is formed with a lower accuracy in comparison with the forming accuracy of the outline thereof.

Figure 4:
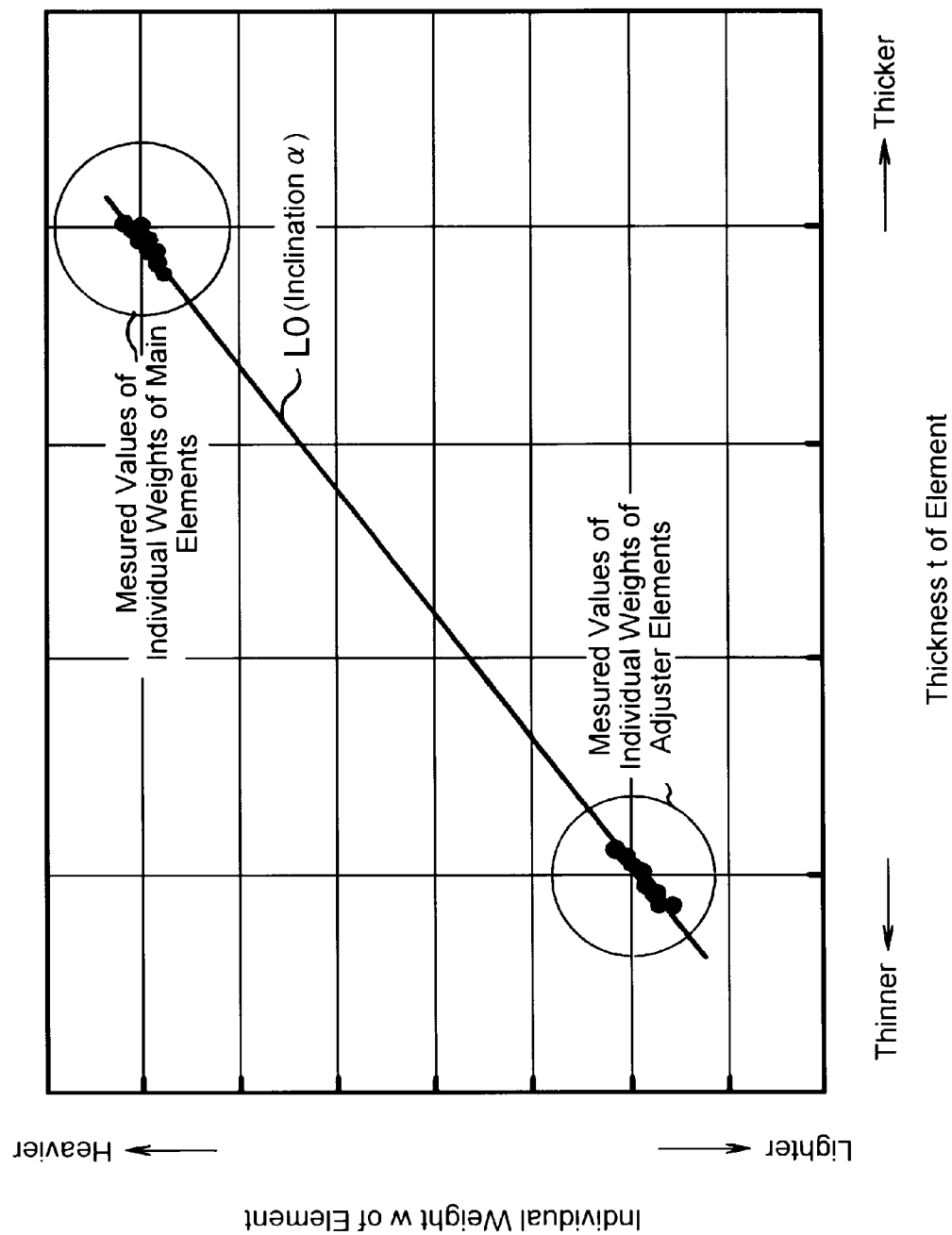
FIG. 4 is a chart schematically showing a relation between an individual weight and a thickness of the element.

This means that an individual weight of each element 1 may be varied depending on the thickness thereof. As shown in FIG. 4, the individual weight of the element 1 is positively correlated with the thickness of the element 1. In other words, the thickness of the element 1 is directly proportional to the weight of the element 1. Therefore, the thickness of the element 1 can be obtained from the weight of the element 1. Specifically, the thickness of the element 1 can be estimated from a measured value of the individual weight of the element 1 by obtaining a relation between the weight of the element 1 and thickness of the element 1 in advance. In addition, a total length of an array of the elements 1 being juxtaposed in its thickness direction can also be estimated from a measured value of the total weight of the elements 1 to be used in the driving belt V.

Thus, the total length of the array of the elements 1 being juxtaposed in its thickness direction can be estimated. Therefore, a circumferential moving range of the elements 1 fastened by the ring 10, that is, an endplay of the driving belt V can be obtained by comparing a total length of the array of the elements 1 being juxtaposed in its thickness direction with a length of the ring 10 to be used to fasten the elements 1, thereby obtaining a deviation therebetween. That is, by obtaining the correlation among the length of the ring 10, the total weight of the elements 1, and an endplay of the driving belt V in advance, the endplay of the driving belt V to be assembled can be estimated by measuring the total weight of the elements 1 to be used in the driving belt V.

According to the present invention, therefore, the endplay of the driving belt V can be adjusted easily and accurately using the above-explained principle, without requiring specific measuring devices or equipments. Specifically, the endplay of the driving belt V can be adjusted by obtaining a correlation among the length of the ring 10, the total weight of the elements 1, and an endplay of the driving belt V in advance, and by measuring the total weight of the element 1 thereby estimating the endplay of the driving belt V to be assembled with reference to the aforementioned correlation. For this reason, according to the present invention, a productivity of the driving belt V can be improved. The manufacturing method of the driving belt V according to the present invention will be explained in more detail hereinafter.

FIRST EXAMPLE

Figure 5:
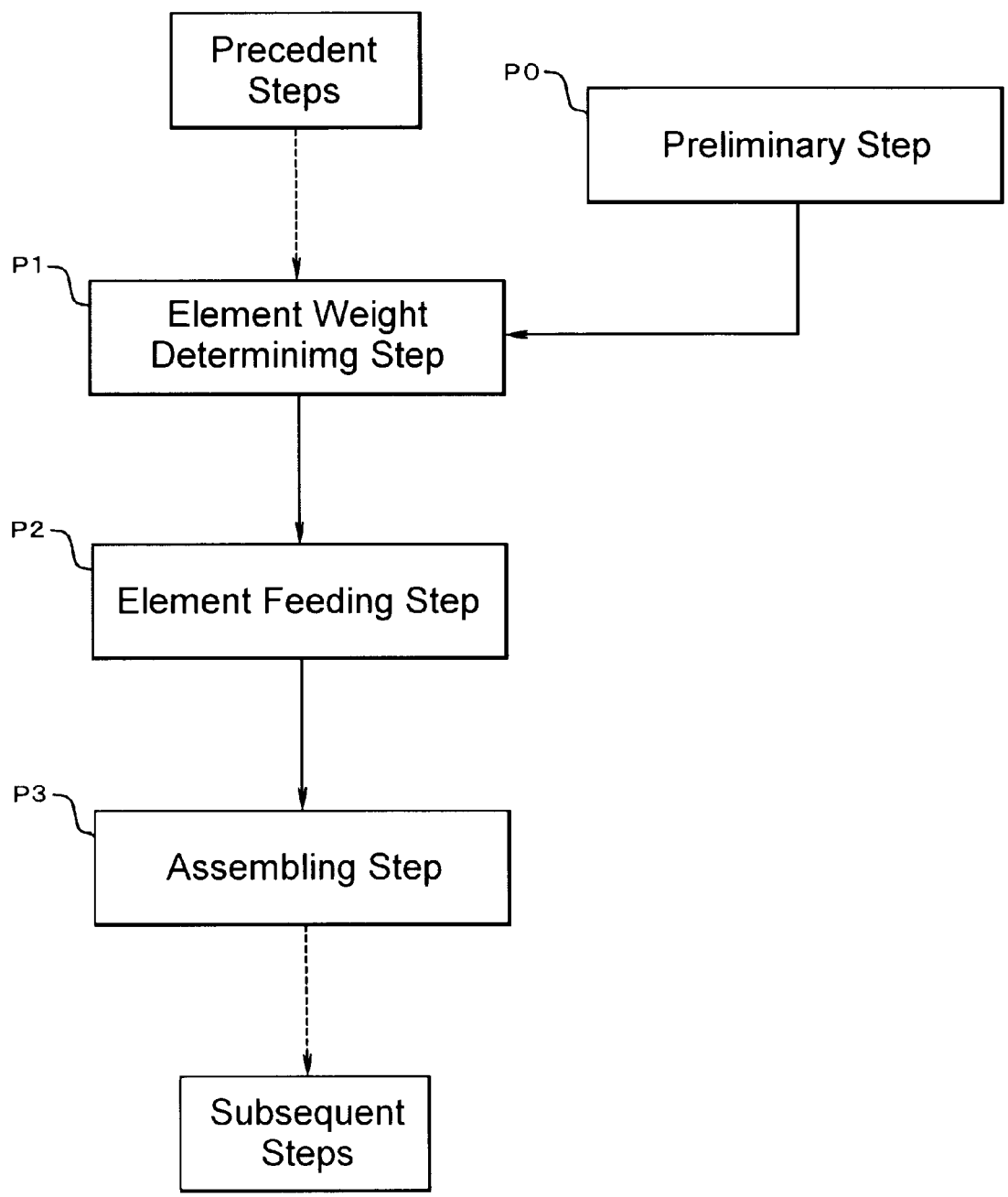
FIG. 5 is a process chart showing main manufacturing processes of the driving belt according to the present invention.

FIG. 5 is a process chart showing main manufacturing processes of the driving belt V according to first example of the present invention. First of all, a correlation among a length of the ring 10, a total weight of the elements 1 being fastened by the ring 10, and an endplay of the assembled driving belt V are obtained in advance at a preliminary step (process P0).

Specifically, at this preliminary step, the length of the ring 10, the total weight of the elements 1 being fastened by the ring 10, and the endplay of the driving belt V are measured from an assembled sample driving belt. Actually, those values are measured from a plurality of assembled driving belts V to collect and accumulate measurement data to address various possible cases to occur during an actual manufacturing process. Specifically, a total weight of the elements 1 of each driving belt V and an endplay of each driving belt V are measured accurately by a skilled person from a plurality of assembled driving belts V. For this purpose, the elements 1 manufactured within an allowable tolerance are used to form an element array in each driving belts V to be measured, but the rings 10 in which the lengths thereof are individually varied within an allowable tolerance are used to fasten the elements 1 in each driving belt V. If such data relating to the lengths of the rings 10 has been measured from the assembled driving belts V and stored in advance by a manufacturer, such measurement data can also be used during a manufacturing process.

Figure 6:
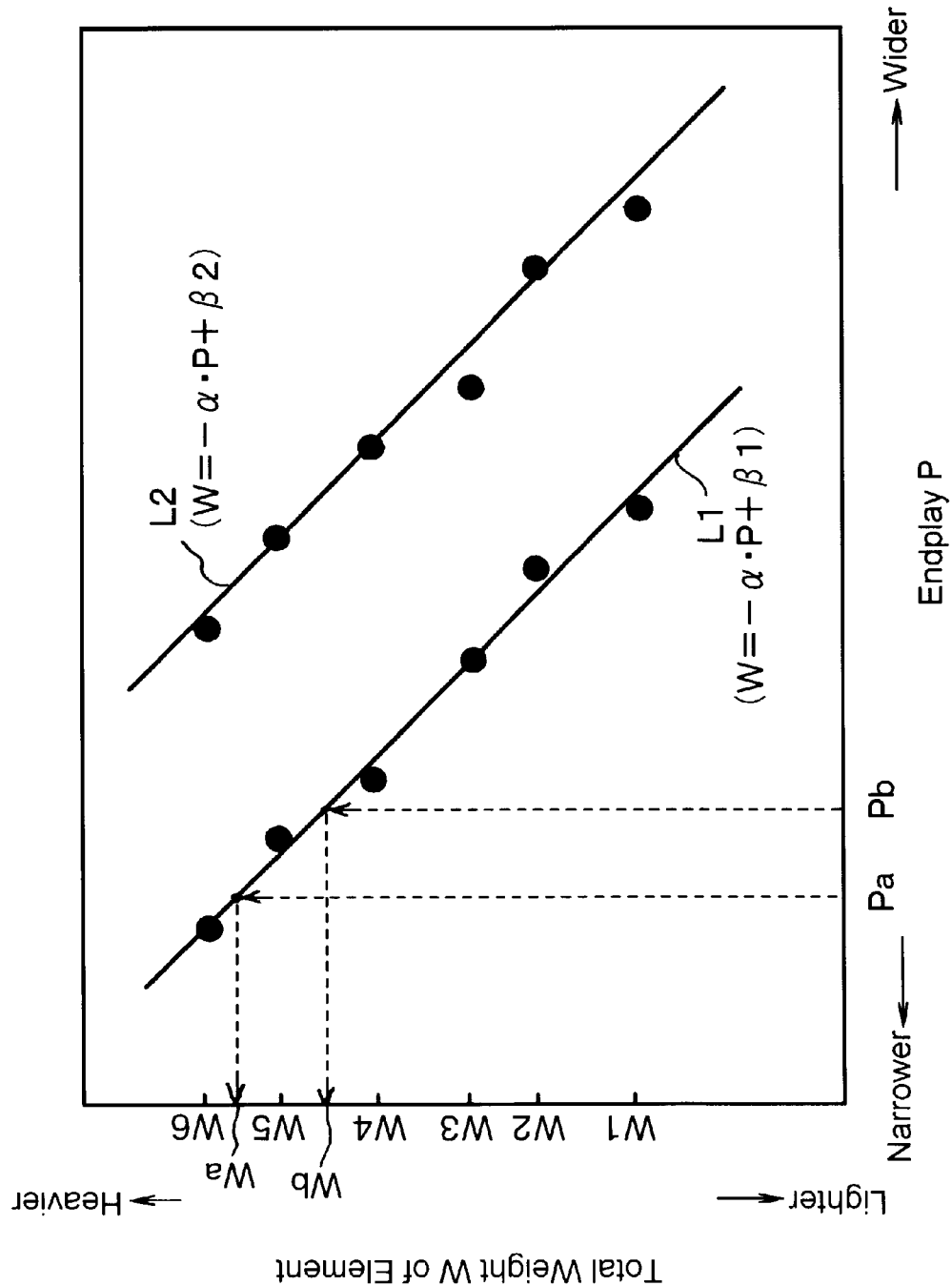
FIG. 6 is a cart schematically showing a correlation among the circumferential length of the ring, the total weight of the elements, and the endplay of the driving belt, and relational expressions expressing the correlation of those factors.

Then, a correlation among the length of the ring 10, the total weight of the elements 1 fastened by the ring 10, and the endplay of the assembled driving belt V is obtained on the basis of the data thus measured. That is, a correlation diagram and correlational expressions shown in FIG. 6 are prepared. Specifically, the correlation among the length C of the ring 10, the total weight W of the elements 1, and the endplay P of the driving belt V is shown in FIG. 6.

More specifically, FIG. 6 indicates a distribution of the endplays P measured from twelve patterns of the driving belts V in total. In order to prepare those driving belts V, six sets of the elements 1 of different total weights W from W1 to W6 ware prepared, and those six sets of the elements 1 ware individually fastened by two kinds of the rings 10 having different lengths C such as C1 to C2. As described, the outline of the element 1 is shaped accurately by a fine blanking etc. Therefore, as shown in FIG. 4, the individual weight w of the element 1 is positively correlated with the thickness t of the element 1. Accordingly, the total weight W of the individual weight w of the elements 1 is also correlated positively with a total length T of the element array as a total of the thicknesses t of the elements 1 being juxtaposed to one another. Meanwhile, the endplay P is a difference between the length C of the ring 10 and the total length T of the elements 1 as expressed by the following formula:

endplay P=length C−total length T

That is, the total weight W of the elements 1 is negatively correlated with the endplay P.

Accordingly, provided that an inclination of a line L0 shown in FIG. 4 indicating the correlation between the individual weight w and the thickness t of the element 1 is represented by "$\alpha$", the relation between the total weight W and the endplay P can be approximately indicated by lines in FIG. 6 where "$-\alpha$" represents an inclination. Specifically, the correlation between the total weight W of the elements 1 fastened by the ring 10 having the length C1 and the endplay P can be indicated by a line L1 shown in FIG. 6. For example, provided that an intercept is $\beta 1$, the total weight W of the elements 1 fastened by the ring 10 having the length C1 can be expressed as:

$$W = -\alpha \cdot P + \beta 1.$$

Likewise, the correlation between the total weight W of the elements 1 fastened by the ring 10 having the length C2 and the endplay P can be indicated by a line L2 shown in FIG. 6. For example, provided that an intercept is $\beta 2$, the total weight W of the elements 1 fastened by the ring 10 having the length C2 can be expressed as:

$$W = -\alpha \cdot P + \beta 2.$$

By thus obtaining the correlation between the total weight W of the elements 1 fastened by the ring 10 having the length C and the endplay P of the assembled driving belt V in advance, the endplay P of the driving belt V to be assembled can be estimated by merely measuring the total weight W of the elements 1 to be fastened by the ring 10 having the length C.

For this reason, an inaccuracy in the measured values resulting from an individual difference and lack of skill of measurers, as well as an inaccuracy in the measured values resulting from unevenness of surface condition of the elements 1 due to adhesion of oil or the like can be decreased in comparison with the conventional manual measuring methods for measuring the endplay P using a clearance gauge, a thickness gauge or the like. As a result, the endplay P of the driving belt V can be obtained accurately. Moreover, according to the first example of the present invention, no specific measuring devices or equipments is required to measure the endplay P of the assembled driving belt V in which all of the elements 1 are juxtaposed and fastened by the ring 10, unlike the conventional measuring method. Further, a step of juxtaposing and holding the elements 1 can be omitted. For these reasons, the endplay P of the driving belt V can be obtained at low cost in a short time.

Alternatively, the total weight W of the elements 1 or a range of the total weight W of the elements 1 to achieve a desired value or range of the endplay P can also be obtained utilizing the method thus has been explained. Therefore, a desired endplay P of the driving belt V can be achieved, or the endplay P of the driving belt V can be adjusted within a desired range, by merely measuring the elements 1 to prepare the elements 1 in the amount of W within the range of achieving the required value or range of the endplay P.

The preliminary step thus has been explained has to be carried out before starting an entire manufacturing process of the driving belts V to obtain and store the above-explained correlation in advance, however, it is unnecessary to carry out such preliminary step at every manufacturing lot of the driving belt V. In the example shown in FIG. 6, although two kinds of the rings 10 having different lengths C1 and C2 are used to obtain the correlation between the total weight W of the elements 1 and the endplay P, such correlation may be obtained using three kinds of the rings 10 having different lengths.

Then, the elements 1 manufactured and individually inspected at precedent steps such as a manufacturing step and an inspecting step are supplied to an element weight determining step (or a process P1). At the element weight determining step, a value or range of a required element weight Wreq as a total weight of the required amount of the elements 1 to achieve the desired endplay P is determined. Specifically, such value or range of the required element weight Wreq is determined with reference to the correlation among the length C of the ring 10, the total weight W of the elements 1 and the endplay P of the driving belt V, which has been obtained in advance at the above-explained preliminary step.

At the element weight determining step, for example, the range of the endplay P is determined as narrow as possible. Then, a target range of the total weight W of the elements 1 to keep the endplay P within the desired range thus determined, that is, a target range of the required element weight Wreq is determined on the basis of the above-explained correlation among the length C of the ring 10, the total weight W of the elements 1 and the endplay P of the driving belt V.

As shown in FIG. 6, in case of setting the endplay P of the driving belt V using the ring 10 of the length C1 to have a length L1 within a predetermined range from Pa to Pb, the predetermined value Pa and Pb are substituted into the aforementioned correlational expression $W=-\alpha \cdot P+\beta 1$. Here, the endplay Pa is smaller than the endplay Pb. As a result, total weights Wa and Wb of the elements 1 corresponding individually to the endplays Pa and Pb are calculated. Alternatively, those total weights Wa and Wb of the elements 1 can also be obtained using the map shown in FIG. 6. The total weight Wa thus obtained is set as an upper limit of the required element weight Wreq, and the total weight Wb thus obtained is set as a lower limit of the required element weight Wreq. That is, such range between Wa and Wb is the target range of the required element weight Wreq.

Then, at an element feeding step (or a process P2), the elements 1 are measured to be prepared in the amount within the target range of the required element weight Wreq determined at the element weight determining step.

Specifically, the elements 1 are fed sequentially to a weight scale while measuring the total weight W thereof sequentially. When a measured value of the total weight W enters into the target range of the required element weight Wreq determined at the element weight determining step, that is, when the measured value of the total weight W exceeds the lower limit of the target range of the required element weight Wreq, such feeding of the elements 1 is stopped. A batch of the elements 1 thus fed to the weight scale until the completion of the feeding is to be provided to the subsequent assembling step.

Then, at the assembling step (or a process P3), the element 1 thus prepared at the element feeding step in the amount to keep the total weight W thereof within the target range of the required element weight Wreq is fastened by the ring 10 to assemble the driving belt V. Thereafter, the assembled driving belt V is provided to subsequent steps such as a final inspection step, a packing step and so on.

In short, according to the first example of the manufacturing method of the driving belt V, the correlation among the length C of the ring 10, the total weight W of the elements 1 and the endplay P of the driving belt V is obtained at the preliminary step. Then, the required element weight Wreq is determined at the element weight determining step using the obtained correlation. At the element feeding step, the elements 1 are measured to be fed in the proper amount to keep the total weight thereof within the required element weight Wreq. The elements 1 thus measured and fed are fastened by the ring 10 at the assembling step to assemble the driving belt V.

Thus, according to the first example, the assembling work for fastening the elements 1 by the ring 10 is carried out only once at the final assembling step. Therefore, conventional measuring step and adjustment step of the endplay P after fastening the elements 1 by the ring 10, as well as disassembling and reassembling of the driving belt V after measuring and adjusting the endplay P can be omitted. For this reason, productivity of the driving belt can be improved significantly.

If one or more piece(s) of the element 1 out of the batch of the elements 1 thus measured and fed in accordance with the required element weight Wreq still remain(s) even after fastening the elements 1 by the ring 10, this means that the total length of the array of the elements 1 being juxtaposed in its thickness direction may be elongated by some reason. In this case, for example, a contact face of (some of) the element(s) 1 may be curved, a hitted mark or a burr may be formed on the contact face of the (some of) the element(s), or a foreign matter may be interposed between the adjoining elements 1. If the driving belt V is assembled under such condition and subjected to practical use, the endplay P may be increased. Consequently, an excessive slippage between the elements 1 and the ring 10 may occur while driving the driving belt V. Otherwise, durability of the driving belt V may be degraded by such a warpage, hitted mark or burr on the contact face.

However, according to the first example of the present invention, if one or more piece(s) of the elements 1 still remain(s) even after fastening the elements 1 by the ring 10, such an imperfect driving belt V can be distinguished to be rejected. Such defection of the element 1 resulting from warpage of the contact face, or formation of a hitted mark or a burr on the contact face cannot be detected by the conventional direct measuring method of the end play P using a clearance gauge or thickness gauge. Thus, according to the manufacturing method of the present invention, it is also possible to find such abnormality of the element 1 due to warpage of the contact face, or formation of a hitted mark or a burr on the contact face. Therefore, the manufacturing method of the present invention is also advantageous to control quality of the driving belt V.

SECOND EXAMPLE

The second example to be explained hereinafter is an alternative of the first example in which a content of the element feeding step is partially altered. Therefore, a detailed explanation of the steps of the second example in common with those of the first example will be omitted.

As the aforementioned first example, the elements 1 are fed sequentially to a weight scale at the element feeding step while measuring the total weight W of the elements 1 sequentially thereby preparing a batch of the elements 1. However, according to the second example, the feeding of the elements 1 is to be stopped when a measured value of the total weight W of the elements 1 exceeds a target feeding weight Wtgt, which is set smaller than the lower limit of the target range of the required element weight Wreq determined at the preceding element weight determining step. The total weight W of the elements 1 measured at the moment when the feeding of the elements 1 is thus stopped is stored as a temporary element weight Wtmp. Then, a difference between the target range of the required element weight Wreq and the temporary element weight Wtmp is calculated to prepare another batch of the elements 1 in the amount corresponding to the weight difference thus calculated. Thereafter, the batch of the elements 1 in the amount corresponding to the temporary element weight Wtmp, and said another batch of the elements 1 in the amount corresponding to the aforementioned difference between the required element weight Wreq and the temporary element weight Wtmp are provided to the subsequent assembling step.

Specifically, at the element feeding step of the second example, the elements 1 are fed sequentially to a weight scale while measuring the total weight W of the elements 1 sequentially. When a measured value of the total weight W reaches the target feeding weight Wtgt set as described, the feeding of the elements 1 is stopped temporarily. The value of the total weight W of the elements 1 measured at the moment when the feeding of the elements 1 to the weight scale is thus stopped is stored as the temporary element weight Wtmp.

After the temporary element weight Wtmp has been measured and stored, a difference between the target range of the required element weight Wreq and the temporary element weight Wtmp is calculated. Specifically, a deviation of the temporary element weight Wtmp from the upper limit of the target range of the required element weight Wreq, and a deviation of the temporary element weight Wtmp from the lower limit of the target range of the required element weight Wreq are calculated individually. That is, a range of a shortage in the total weight of the batch of the elements 1 prepared in the amount of the temporary element weight Wtmp with respect to the target range of the required element weight Wreq is obtained.

Then, another batch of the elements 1 is measured to be prepared in the amount within the obtained range of the difference between the temporary element weight Wtmp and the target range of the required element weight Wreq. This another batch of the elements 1 is to be fastened by the ring 10 together with the batch of the elements 1 previously prepared in the amount of the temporary element weight Wtmp. Therefore, the elements 1 can be prepared accurately and easily by one procedure, in the amount corresponding to the required element weight Wreq determined at the element weight determining step, without excess and deficiency. Then, both of the batches of the elements 1 thus prepared are provided to the subsequent assembling step.

Thus, at the element feeding step of the second example, the target feeding weight Wtgt is set to be smaller than the lower limit of the target range of the required element weight Wreq determined at the preceding element weight determining step. Then, the batch of the elements 1 is prepared in the amount of the temporary element weight Wtmp by stopping the feeding of the elements 1 when the total weight of the elements 1 being fed exceeds the target feeding weight Wtgt. Meanwhile, another batch of the elements 1 are separately measured to be prepared in the amount corresponding to the difference between the required element weight Wreq and the temporary element weight Wtmp. Then, the batch of the elements 1 prepared in the amount of the temporary element weight Wtmp is supplied to the subsequent assembling step, together with said another batch of the elements 1 prepared in the amount corresponding to the weight difference between the required element weight Wreq and the temporary element weight Wtmp.

According to the second example of the present invention, therefore, the required amount of the elements 1 to be fastened by the ring 10, that is, the elements 1 in the amount corresponding to the required element weight Wreq can be prepared easily and accurately to he supplied to the subsequent steps. For this reason, it is unnecessary to add the element(s) 1 repeatedly or to eject the redundant element(s) 1 to adjust the total weight W of the elements 1 within the target range of the required element weight Wreq. Thus, the productivity of the driving belt V can be further improved.

THIRD EXAMPLE

The third example to be explained hereinafter is an alternative of the second example in which contents of the preliminary step, the element feeding step, and the elements to be used are partially altered. Therefore, a detailed explanation of the steps of the third example in common with those of the first and the second examples will be omitted.

According to the third example, two kinds of the elements having different average individual weights are to be used. Specifically, a main element 1a whose individual weight is relatively heavier and an adjuster element 1b whose individual weight is relatively lighter are to be used in the third example. Although the outlines of those elements 1a and 1b are shaped with a common accuracy criterion, the thicknesses of those elements 1a and 1b are shaped with different accuracy criterions.

Specifically, the main element 1a is adapted to be used mainly to be fastened by the ring 10 to form the driving belt V, and the main elements 1a have an average thickness ta. On the other hand, the adjuster element 1b is adapted to be used in the driving belt V supplementary to adjust the endplay P of the driving belt V. Therefore, an average thickness of the adjuster elements tb is thinner than the average thickness ta of the main elements 1a. As described, the elements 1 to be used in the present invention are formed by a precision press working such as a fine blanking or the like so that the outline of the elements 1 are shaped highly accurately. Therefore, the individual weight w of the element 1 is directly proportional to the thickness t thereof. This means that the individual weight of the adjuster element 1b having the thinner thickness than that of the main element 1a is lighter than the individual weight of the main element 1a.

As in the first example, a correlation among the length C of the ring 10, the total weight W of the elements 1 to be fastened by the ring 10, and the endplay P of the driving belt V is also obtained in advance at the preliminary step of the third example. In addition, a combined weight Wcmb of a predetermined quantity of the main element(s) 1a and a predetermined quantity of the adjuster element(s) 1b is obtained individually in different combinations.

Specifically, the combined weights Wcmb of all of the combinations of the main element(s) 1a and the adjuster element(s) 1b in which a total numbers of the elements 1a and 1b comes to a predetermined number N are calculated and recorded for the purpose of preparing a conversion table shown in FIG. 7. Alternatively, such calculation results of the combined weights Wcmb may also be stored into a computer program in case of automating the manufacturing method of the present invention using an automatic apparatus.

Specifically, the aforementioned predetermined number N is an integer number, which is obtained by rounding the digits after the decimal point of a below-mentioned predetermined value N'. Here, the predetermined value N' is calculated by the following formula:

$$N'=(wa-dW)/|wa-wb|$$

where wa represents an individual weight of the main element $1a$, wb represents an individual weight of the adjuster element $1b$, and dW represents a weight difference between the upper limit and the lower limit of the required element weight Wreq, that is, dW represents a target range of the total weight W of the elements 1 to keep the endplay P within a target range.

As the aforementioned second example, the elements 1 are fed sequentially to a weight scale also at the element feeding step of the third example thereby measuring the total weight W of the elements 1 sequentially. When a measured value of the total weight W exceeds the target feeding weight Wtgt, such feeding of the elements 1 is stopped. The total weight W of the elements 1 measured at the moment when the feeding of the elements 1 is thus stopped is stored as a temporary element weight Wtmp. Then, a difference between the target range of the required element weight Wreq and the temporary element weight Wtmp is calculated. That is, a range of a shortage of the total weight of the elements 1 with respect to the range of the required element weight Wreq is calculated.

In the third example, the target feeding weight Wtgt is set to satisfy the following expression:

$$\{WL-N\cdot\text{Max}(wa,wb)\} \leq Wtgt \leq [WL-\{N\cdot\text{Min}(wa,wb)+wa-dW\}]$$

where Max(wa,wb) represents to select the larger value out of the values wa and wb, Min(wa,wb) represents to select the smaller value out of the values wa and wb, and WL represents the lower limit of the required element weight Wreq.

Then, one of the combinations of the main element(s) $1a$ and the adjuster element(s) $1b$ listed e.g., in the table shown in FIG. 7 is selected to prepare a supplemental batch of the elements 1, in which the combined weight Wcmb thereof is within the calculated range of the difference between the total weight of the batch of the elements 1 prepared in the amount of the temporary element weight Wtmp and the required element weight Wreq.

Thus, the batch of the elements 1 is measured to be prepared in the amount of the temporary element weight Wtmp in advance, and the supplemental batch of the elements 1 having the selected combined weight Wcmb is also prepared to assemble the driving belt V. Therefore, the elements 1 can be prepared by one procedure easily and accurately in the amount corresponding to the required element weight Wreq determined at the element weight determining step. Then, both batches of the elements 1 thus prepared are provided to the subsequent assembling step.

According to the third example of the present invention, two kinds of the element 1 such as the main element $1a$ whose individual weight is wa and the adjuster element $1b$ whose individual weight is wb are thus used to assemble the driving belt V. In addition, as can be seen from the table shown in FIG. 7, the adjuster element $1b$ will not be used in case the combination which does not contain the adjuster element $1b$ is selected.

In summary, according to the third example of the present invention, the correlation among the length C of the ring 10, the total weight W of the elements 1, and the endplay P of the driving belt V, as well as the combined weights Wcmb of the main element(s) $1a$ and the adjuster element(s) $1b$ are obtained in advance at the preliminary step. Then, at the element feeding step, the target feeding weight Wtgt is set to be smaller than the lower limit of the target range of the required element weight Wreq. Thereafter, the batch of elements 1 is prepared in the amount of the temporary element weight Wtmp by stopping the feeding of the elements 1 when the total weight of the elements 1 being fed exceeds the target feeding weight Wtgt. Meanwhile, another batch of the elements 1 is prepared by selecting one of the prepared combined weights Wcmb of the element(s) $1a$ and $1b$ corresponding to the difference between the required element weight Wreq and the temporary element weight Wtmp. The batch of the elements 1 prepared in the amount of the temporary element weight Wtmp is supplied to the subsequent assembling step, together with said another batch of the elements 1 containing the elements $1a$ and $1b$ thus prepared by selecting one of the combined weights Wcmb.

According to the third example of the present invention, therefore, the required number of the elements 1 to be fastened by the ring 10, that is, the elements 1 in the amount corresponding to the required element weight Wreq can be prepared easily and accurately to be supplied to the subsequent steps. For this reason, it is unnecessary to add the element(s) 1 repeatedly or to eject the redundant element(s) 1 to adjust the total weight W of the elements 1 within the target range of the required element weight Wreq. Thus, the productivity of the driving belt V can be further improved.

In addition, since the combined weights Wcmb of different combinations of the main element(s) $1a$ and the adjuster element(s) $1b$ are measured and stored in advance, the element feeding step can easily be automated or mechanized to adjust the number of the elements 1 to the amount corresponding to the required element weight Wreq.

Here, the present invention should not be limited to the aforementioned example. That is, although the examples of the present invention thus far describe relate to the driving belt used in a belt type continuously variable transmission, the present invention can also be applied to a driving belt to be applied to another kind of transmission mechanism composed mainly of a belt and pulleys.

The invention claimed is:

1. A manufacturing method of a driving belt having an endless ring, and a plurality of plate elements juxtaposed in a length direction of the ring and fastened by the ring, comprising:

obtaining a correlation among a circumferential length of the ring, a total weight of the elements fastened by the ring, and a range of a movement of the fastened elements in the length direction of the ring;

determining a range of a required element weight as a total weight of the elements to be fastened by the ring, on the basis of the obtained correlation, a desired moving range of the element, and the length of the ring;

feeding the elements in the amount within the determined range of the required element weight, while measuring a total weight of the elements being fed; and fastening the fed elements by the ring.

2. The manufacturing method of a driving belt as claimed in claim 1, wherein the elements to be fastened by the ring are prepared by:

feeding the elements sequentially to a weight scale while measuring a total weight of the elements being fed;

preparing a batch of the elements in the amount of a temporary element weight, by stopping the feeding of the elements at a moment when the total weight of the element being fed exceed a target feeding weight which is set smaller than a lower limit of the range of the required elements weight;

preparing another batch of the elements in the amount corresponding to a difference between the range of the required element weight and the temporary element weight; and providing both of the batches of the elements to be fastened by the ring.

3. The manufacturing method of a driving belt as claimed in claim 2, wherein:

the element includes a main element and an adjuster element having a different individual weight from that of the main element;

a plurality of combined weights of combinations of a various quantity of the main element(s) and a various quantity of the adjuster element(s) are obtained in advance; and the batch of the elements prepared in the amount of the temporary element weight is fed to be fastened by the ring, together with another batch of the elements including the main element(s) and the adjuster element(s) prepared in the amount of one of the combined weights selected from the combined weights obtained in advance to compensate a shortage of the elements with respect to the required element weight.

4. The manufacturing method of a driving belt as claimed in claim 3, wherein:

the individual weight of the adjuster element is lighter than that of the main element.

* * * * *